United States Patent [19]

Roberts, Jr.

[11] 4,037,626
[45] July 26, 1977

[54] HIGH STRENGTH COMPOSITE PIPE STRUCTURE HAVING LEAKPROOF JOINTS

[75] Inventor: James E. Roberts, Jr., Canton, Ohio

[73] Assignee: Standard Oil Company (Indiana), Chicago, Ill.

[21] Appl. No.: 613,051

[22] Filed: Sept. 15, 1975

[51] Int. Cl.² .......................... F16L 9/06; F16L 21/00
[52] U.S. Cl. .................................... 138/109; 138/121; 138/155; 285/138; 285/DIG. 4
[58] Field of Search ............... 138/173, 109, 121, 120, 138/140, 148, 155, 100, 101, 102; 277/1, 228; 285/344, 138, DIG. 4

[56] References Cited

U.S. PATENT DOCUMENTS

| | | | |
|---|---|---|---|
| 3,257,719 | 6/1966 | Larkfeldt | 285/344 X |
| 3,330,303 | 7/1967 | Fochler | 138/121 X |
| 3,332,446 | 7/1967 | Mann | 138/114 |
| 3,767,211 | 10/1973 | Amphlett | 277/1 |
| 3,920,268 | 11/1975 | Stewing | 138/155 X |
| 3,926,222 | 12/1975 | Shroy et al. | 285/DIG. 4 X |
| 3,929,359 | 12/1975 | Schmunk et al. | 285/DIG. 4 X |
| 3,958,425 | 5/1976 | Maroschak | 285/DIG. 4 X |

*Primary Examiner*—Richard E. Aegerter
*Assistant Examiner*—James E. Bryant, III
*Attorney, Agent, or Firm*—Robert R. Cochran; Arthur G. Gilkes; William T. McClain

[57] ABSTRACT

An improved plastic composite pipe structure includes an outer corrugated pipe, an inner smooth-walled liner, and joining means including a bell fitting at one end of the liner extending beyond the outer corrugated pipe and a spigot fitting at the other end. The corrugations of the outer pipe at the spigot end are undercut so as to slide over and provide crush resistance to the joint that is formed when the spigot of one composite pipe section is inserted into and engaged with the bell of an adjacent composite pipe section. A seal, for example, an elastomeric gasket, solvent weld, or elastomer-based adhesive is used to provide a leakproof joint. Optionally, an outer pipe cover can be utilized as a component of the composite pipe.

7 Claims, 7 Drawing Figures

HIGH STRENGTH COMPOSITE PIPE STRUCTURE HAVING LEAKPROOF JOINTS

BACKGROUND OF THE INVENTION

This invention relates generally to a plastic composite pipe structure and more particularly to a crush-resistant, leakproof, plastic composite pipe structure.

Various types of pipe structures have been proposed for use under a variety of environmental conditions. Conventional smooth-bore pipe, for example, is widely used in the conveyance of fluids, the sections of which may be joined end-to-end by means of bolted flanges, sleeve couplings, bell and spigot fittings, and the like. However, in order to withstand high hydraulic pressures and/or to possess high crush-resistance when utilized in underground applications, the wall thickness of conventional smooth-bore pipe must be increased substantially. In many cases, an excessive amount of material must be employed to fabricate the pipe, resulting in excessive weight and uneconomical costs.

Corrugated pipe has been proposed to overcome some of the disadvantages of smooth-bore pipe. It has been found, however, that although the corrugated configuration improves crush resistance it also contributes to poor hydraulic characteristics in the transmission of fluids.

Composite tubes as disclosed, for example, in U.S. Pat. No. 3,330,303, comprise an inner smooth-walled tube and an outer corrugated tube and possess improved crush resistance. Sections of such composite tubes are joined by means of a resilient collar fitted over the outer corrugations of adjacent sections. Alternatively, joining is effected by shaping the outer corrugated tube to provide a bell and spigot arrangement. In both instances, the smooth-walled inner tube is joined in a simple butt fit. Such an arrangement may serve as a satisfactory conduit for electrical wires and cables but would be highly susceptible to leakage in the conveyance of fluids, particularly those under pressure.

SUMMARY OF THE INVENTION

The present invention provides an improved plastic composite pipe for conveying fluids comprising an outer corrugated pipe and a smooth-walled liner fitted within and affixed to the corrugated pipe. The inside diameter of the corrugated pipe is made slightly greater than the outside diameter of the liner to provide secure affixation of the liner within the corrugated pipe. When additional strength is required, a suitable adhesive is applied to the points of contact between the outer and inner pipes. Means for end-to-end joining of sections of composite pipe include a bell fitting at one end of the liner extending beyond the outer corrugated pipe and a spigot fitting at the other end. The corrugations of the outer pipe at the spigot end are undercut so as to slide over and provide crush resistance to the joint that is formed when the spigot of one composite pipe section is inserted into and engaged with the bell of an adjacent composite pipe section. To provide a leakproof assembly, the joint is adapted to receive a seal such as, for example, an elastomeric gasket, a solvent weld, or an elastomer-based adhesive. Optionally, an outer pipe cover can be utilized as a component of the composite pipe.

Accordingly, it is an object of the present invention to provide an improved plastic composite pipe having high-crush resistance and novel means for end-to-end joining of composite pipe sections in a crush-resistant and leakproof joint.

It is a further object of this invention to provide a composite pipe structure of the character described that can be readily and economically produced by conventional plastic fabricating techniques.

Other objects and advantages of the invention will be apparent by reference to the following drawings and descriptions.

PREFERRED EMBODIMENTS OF THE INVENTION

Figure 1:
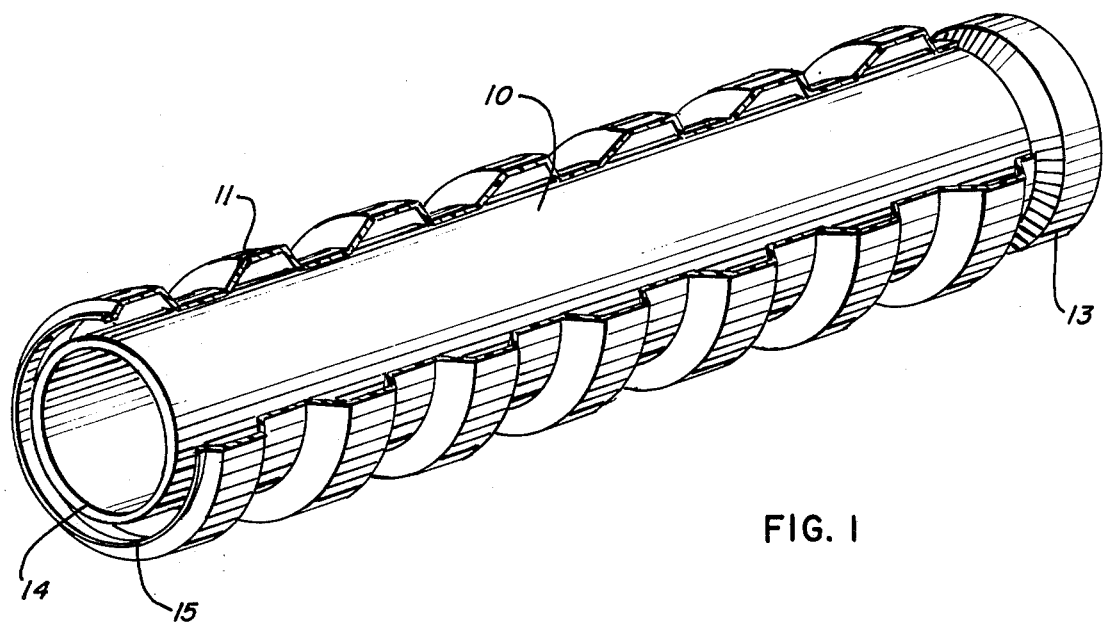
FIG. 1 is a perspective view of the composite pipe of the present invention illustrating the novel bell and spigot joining arrangement.
Figure 2:
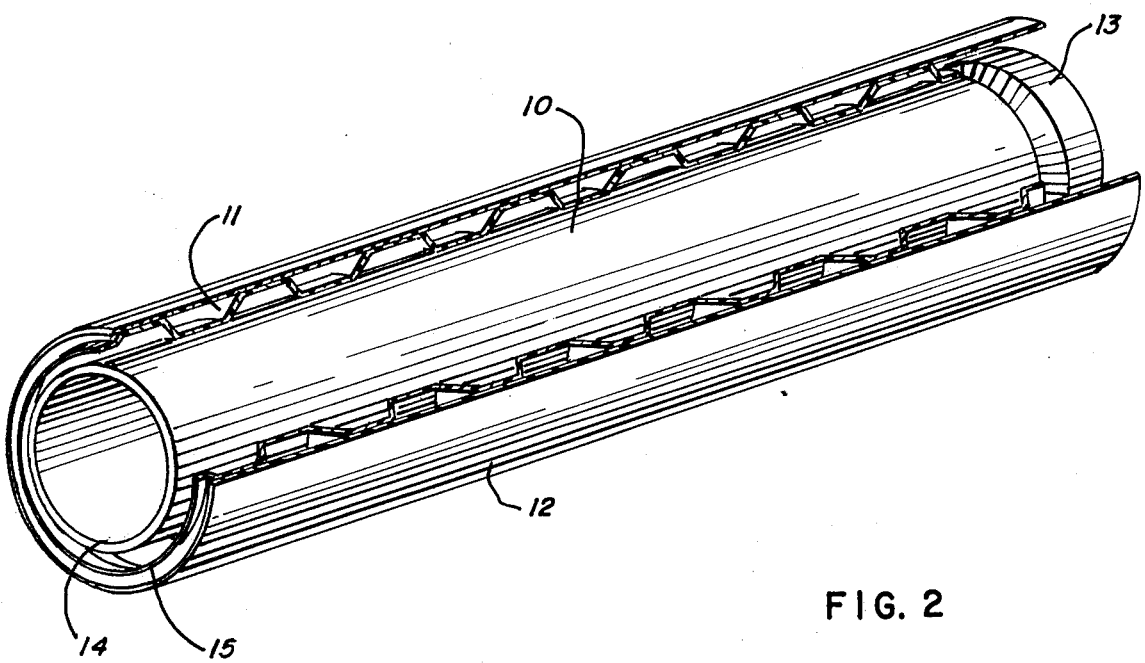
FIG. 2 is a perspective view of another embodiment of the invention wherein an outer smooth-walled cover is utilized.

FIGS. 1 and 2 show the composite pipe structure including the inner smooth-walled liner 10, the outer corrugated pipe 11 and the optional outer cover 12. The liner, outer corrugated pipe, and outer cover are fabricated in flexible or rigid form from any suitable plastic. Thermoplastic resins are used advantageously, particularly polyethylene, polypropylene, ethylene-propylene copolymers, polyvinyl chloride (PVC), and acrylonitrile-butadiene-styrene (ABS) terpolymer. The selection of a specific plastic for a specific number of the composite pipe will in general be dictated by service requirements and cost considerations. Thus, in the conveyance of corrosive fluids, the liner is made of a corrosive resistant plastic such as PVC or ABS. If the pipe is to be buried in highly corrosive soil, the outer cover is fabricated of corrosion resistant plastic such as PVC or ABS.

Use of dissimilar plastic materials for the members of the composite pipe is highly advantageous. For example, in the need for the composite pipe to have high crush resistance in deep-burial service and to handle large-volume hydraulic flow, an inexpensive corrugated polystyrene outer pipe together with a polyethylene or a PVC inner liner are employed. Such pipe can also be used for handling various corrosive chemicals or effluents. In the need for a strong, highly insulated pipe for use in a highly corrosive external environment, the outer cover can be fabricated from PVC, the corrugated pipe of polystyrene, and the inner liner of polypropylene or polyethylene. The dead-air space between the liner and the outer cover provides excellent insulation characteristics.

As illustrated in FIGS. 1 and 2 means for end-to-end joining comprise a bell 13 formed from the liner and extending beyond the outer corrugated pipe and a spigot 14. Corrugations 15 at the spigot end are undercut to permit sliding over and covering the joint formed when the spigot of one composite pipe section is inserted into the bell of another composite pipe section.

Figure 3:
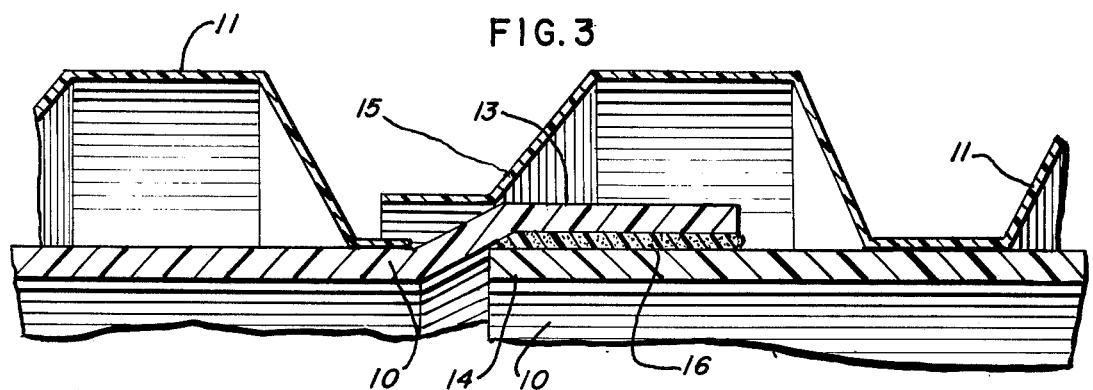
FIG. 3 is a fragmentary cross-section of the joint formed when the bell end of one composite section is coupled with the spigot end of another section.
Figure 4:
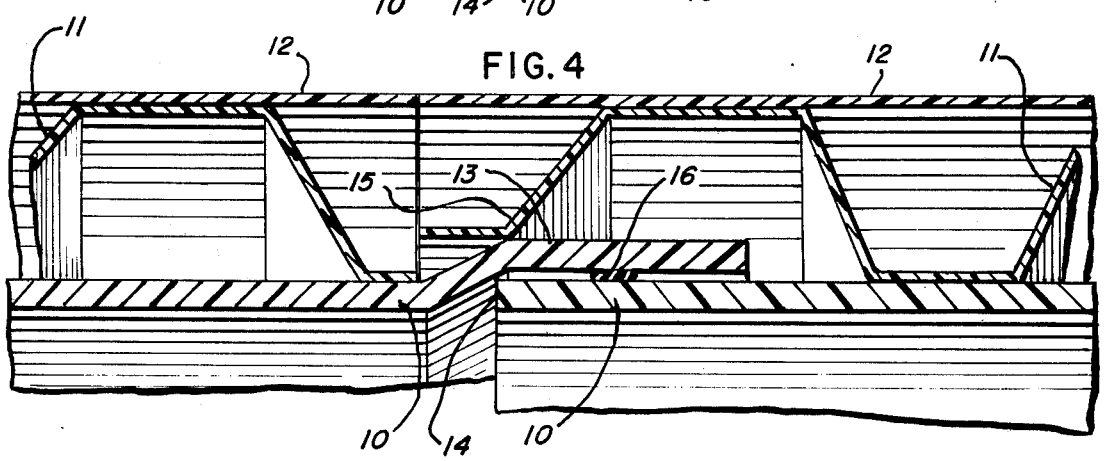
FIG. 4 is a fragmentary cross-section of the joint formed when the joined composite pipe sections include an outer cover.

The joint thus formed as illustrated in section in FIGS. 3 and 4, is protected by the corrugations of the outer pipe and therefore exhibits high crush resistance.

The joint as illustrated in FIGS. 3 and 4, is adapted to receive a seal 16. The seal in FIG. 4 is an O-ring or a gasket fitted over the spigot and is suitably fabricated from an elastomeric material such as rubber or an elastomeric plastic composition. Use of this type of seal provides ease of disassembly of composite pipe sections for cleaning and inspection. For permanent joining, as shown in FIG. 3, a solvent capable of softening the plastic is applied to the mating surfaces of the joint, the surfaces are engaged, and a solvent weld is thereby effected. Suitable welding solvents are well-known in the art. A useful solvent is ketone based, for example, methyl-ethyl ketone neat or methyl-ethyl ketone containing a small amount of the plastic to be welded. Alternatively, a plastic-based adhesive is applied to the mating surfaces of the joint when a permanent seal is desired. Useful adhesive compositions are also well-known and comprise, for example, rubber or an elastomeric plastic and a solvent such as methyl-ethyl ketone or xylene.

Figure 5:
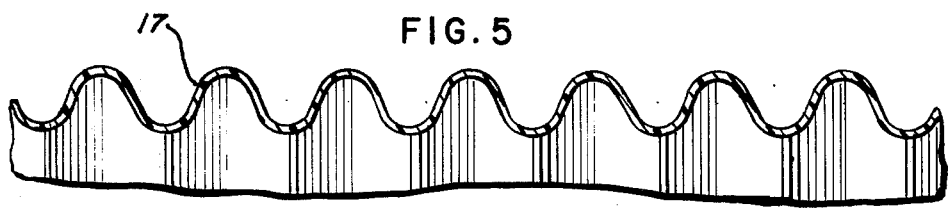
FIGS. 5 – 7 inclusive are fragmentary views showing the various forms the corrugations can take in construction of the outer corrugated pipe.
Figure 6:
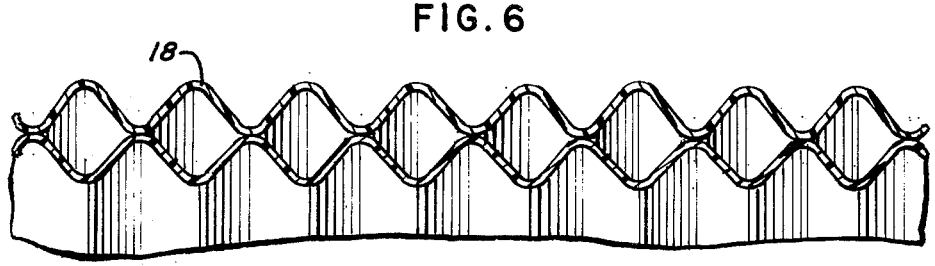
Figure 7:
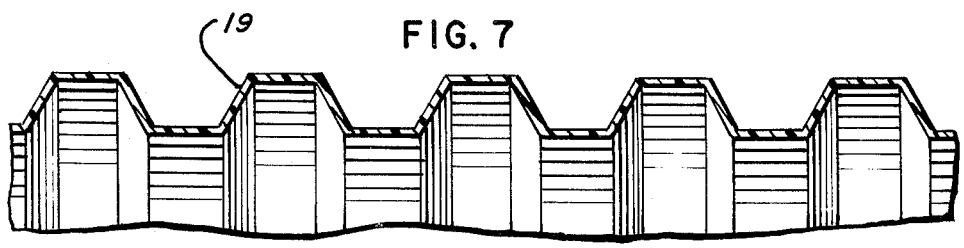

FIGS. 5 – 7 inclusive illustrate various types of corrugations that can be employed in fabrication of the outer corrugated pipe. FIG. 5 shows a typical rounded corrugation profile 17; FIG. 6 shows dual corrugations 18; FIG. 7 shows angular corrugations 19. The corrugations may be fabricated in the typical radial configuration in relation to the pipe axis. For some applications, the corrugations may be fabricated in a helical or an axial configuration with respect to the pipe axis.

The composite pipe structure of the present invention can be readily and economically fabricated from thermoplastic resins by techniques well-known in the art. For example, the inner liner or the optional outer cover can be extruded from an annular die to the desired length and diameter. The corrugated pipe is also extruded from an annular die and while still in the plastic state is pressed into a molding having the desired corrugation profile. Alternatively, the composite pipe members can be simultaneously extruded from concentric annular dies. The outer extrudate is subjected to the action of a rotating mold to form the desired corrugations. The inner smooth-walled extrudate is of such dimension as to fit tightly within the corrugated pipe. For the purpose of end-to-end joining of composite pipe sections, a bell is shaped at one end of the liner and a spigot at the other end. The corrugations at the spigot end are undercut so as to slide over the joint formed when the spigot of one composite pipe section is inserted into the bell of another composite pipe section.

The pipe system assembled from a plurality of composite pipe sections of the present invention is suited to the conveyance of fluids. Particularly advantageous areas of utility are sewer pipe laterals from house to septic tank or sewer main; residential and industrial drain-waste-vent piping; large diameter sewer mains; drain pipe such as municipal storm drains, highway under-drains, and large culverts; pressure pipe such as large diameter underground water mains; and industrial process pipe operating in corrosive atmospheres and/or conveying corrosive liquids or gases.

From the foregoing description and illustrations it is clear that the present invention provides an improved composite pipe structure and novel means for joining composite pipe sections in crush resistant and leakproof joints. Consequently, pipe sections fabricated and joined as provided for by this invention are particularly suited to the conveyance of fluids in underground installations under a wide variety of environmental conditions. The composite pipe structure by virtue of its crush resistant and leakproof characteristics minimizes fluid losses and thereby offers a high degree of environmental protection against contamination.

The descriptions and illustrations used herein are not intended to limit or exclude modifications or equivalent features obvious to one skilled in the art within the scope of the invention.

What is claimed is:

1. A leakproof, plastic composite pipe for conveying fluids comprising:
   a. an outer corrugated pipe, the corrugations thereof defining an inner and an outer pipe diameter;
   b. a smooth-walled liner fitted within and affixed to the outer corrugated pipe at the corrugations defining the inner diameter thereof; and
   c. joining means for end-to-end joining of composite pipe sections comprising a bell at one end of the liner extending axially beyond the outer corrugated pipe, and a spigot at the other end of the liner coextensive with the outer corrugated pipe, the last corrugation coextensive with the spigot having a portion of the valley of the corrugation extending over the end of the spigot and adapted to slide over and cover the joint formed when the spigot of one composite pipe section is inserted into and engaged with the bell of an adjacent composite pipe section, said joining means being adapted to receive sealant means to provide a joint impervious to fluid leakage.

2. The composite pipe of claim 1 wherein additionally a rigid, smooth-walled plastic pipe is fitted over and affixed to the outer corrugated pipe at the corrugations defining the outer diameter thereof.

3. The composite pipe of claim 1 wherein at least one pipe member is made of a thermoplastic resin selected from the group consisting of polyethylene, polypropylene, polyethylene-polypropylene copolymers, polystyrene, acrylonitrile-butadiene-styrene (ABS) terpolymer, and polyvinyl chloride.

4. The composite pipe of claim 2 wherein at least one pipe member is made of a thermoplastic resin selected from the group consisting of polyethylene, polypropylene, polyethylene-polypropylene copolymers, polystyrene, acrylonitrile-butadiene-styrene (ABS) terpolymer, and polyvinyl chloride.

5. The composite pipe of claim 1 wherein the sealant means is an elastomeric gasket adapted to fit over the spigot.

6. The composite pipe of claim 1 wherein the sealant means comprises a solvent weld obtained by applying a solvent for plastic to the engaging surfaces of the joining means.

7. The composite pipe of claim 1 wherein the sealant means comprises a resilient seal obtained by applying an elastomer-based adhesive to the engaging surfaces of the joining means.

* * * * *